United States Patent Office.

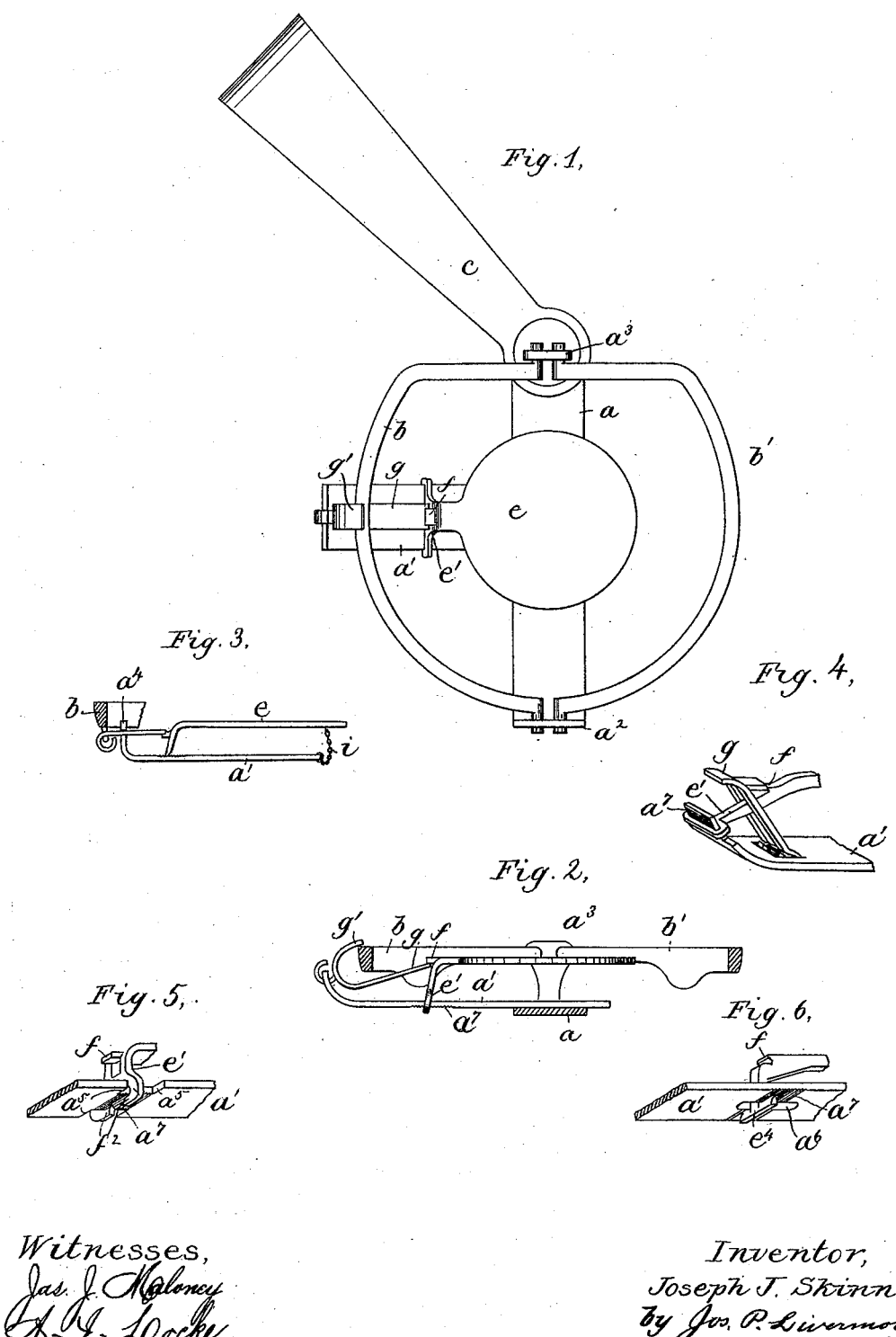

JOSEPH J. SKINNER, OF BOSTON, MASSACHUSETTS.

ANIMAL-TRAP.

SPECIFICATION forming part of Letters Patent No. 351,807, dated November 2, 1886.

Application filed March 17, 1886. Serial No. 195,534. (No model.)

*To all whom it may concern:*

Be it known that I, JOSEPH J. SKINNER, of Boston, county of Suffolk, State of Massachusetts, have invented an Improvement in Animal-Traps, of which the following description, in connection with the accompanying drawings, is a specification, like letters on the drawings representing like parts.

My invention relates to steel-traps of the class in which a pair of jaws are actuated by a spring in such a manner as to catch an animal that presses down upon the trigger or bait-pan between the open jaws.

The object of the invention is to simplify the construction of the trap, and render it more certain and delicate in operation.

Instead of pivoting the bait-pan on a post fixed on the base-plate or frame-work of the trap, it is in accordance with the present invention connected or engaged directly with the cross-piece and fulcrumed thereon, by which arrangement it is possible to set the trap with various degrees of fineness, or so that it may be sprung by a greater or less pressure on the bait-pan.

In other applications, Serial Nos. 195,535, 195,536, 195,537, filed March 17, 1886, I have shown and described several different constructions of the dog and its mode of co-operating with the jaw and the bait-pan or trigger, which constructions of the dog are not of themselves herein claimed, the present invention being intended to cover the construction of the bait-pan and its mode of attachment to the frame-work of the trap, in combination with the jaw controlled by said bait-pan, either directly or through the intervention of a suitable dog.

Figure 1 is a plan view of a trap embodying this invention; Fig. 2, a transverse section thereof through the middle of the jaws, showing the dog and bait-pan in side elevation; Fig. 3, a detail showing in elevation a modified arrangement of the trigger, dog, and jaw; Fig. 4, a detail showing in perspective another arrangement that may be adopted; and Figs. 5 and 6, details showing in perspective modifications of the means for connecting the trigger with the base-plate.

The base-plate or frame-work $a$ of the trap is provided with the usual projections, $a^2$ $a^3$, to which the jaws $b$ $b'$ are pivoted in the usual manner, the jaws being actuated by the usual spring, $c$. The base-plate $a$ has a cross-piece, $a'$, that serves as a support for trigger or bait-pan $e$, the shank $e'$ of which is engaged or loosely connected with the cross-piece $a'$, as hereinafter described, in such manner that the bait-pan is free to slide along the said cross-piece. The bait-pan is also provided with a projection or finger, $f$, which, when the said pan is moved to the proper position along the cross-piece $a'$, may engage the dog $g$, that holds the jaw $b$ against the force of the spring $c$, tending to close the jaws. The dog $g$ may be of usual construction, pivoted at the end of the cross-piece $a'$, and passing over the jaw $b$; or the construction of the dog may be modified in various ways, several of which modifications of the dog are shown in other applications, Serial Nos. 195,535, 195,536, and 195,537, filed by me March 17, 1886, which modifications are shown in the various figures of the drawings of this application.

As shown in Figs. 1 and 2, the dog $g$ is pivoted at the end of the cross-piece, and extends below the jaw $b$, having a finger, $g'$, which holds the jaw, as described and claimed in application, Serial No. 195,536, filed by me herewith. As shown in Fig. 3, the dog $g$ is connected with the jaw $b$, and passes under the fulcrum-piece $a^4$ on the cross-piece $a'$, as shown in application, Serial No. 195,535, filed by me herewith, and in Fig. 4 the trigger is shown as co-operating with a dog, $g$, pivoted between the point of engagement of the trigger with the cross-piece and the middle of the trap, and extending upward to engage the jaw, as shown in another application filed by me.

The trigger or bait-pan $e$ may be composed of a piece of sheet metal cut in dies to the proper shape to engage the cross-piece $a'$, and the finger $f$ may be struck up from the blank which forms the trigger or bait-pan, and suitably shaped to co-operate with the dog. The stem or shank $e'$ of the trigger may have a loop or opening to receive the cross-piece $a'$ within it, as shown in Fig. 4, or the said stem may be provided with fingers $f^2$, that may be bent to engage the cross-piece, which may be reduced in width at the part thus engaged, as shown in Fig. 5, so that the sliding movement of the trigger or bait-pan on the cross-piece will be limited by the shoulders $a^5$ at the end of the said reduced portion.

The trigger may, if desired, be made of a casting instead of sheet metal, and it may be connected with the cross-piece, as shown in Fig. 6, by means of a T-shaped shank, $e^4$, co-operating with a slot, $a^6$, in the cross-piece. The said slot and the trigger or bait-pan may be of such length that when the trap is sprung the closed jaws will prevent the trigger from being turned sufficiently far to disengage its shank from the cross-piece; but when the jaws of the trap are open the said trigger may be turned at right angles to its normal position to insert the end of its shank in the slot of the cross-piece, after which it may be turned to its proper position, swinging over the upper faces of the open jaws. If desired, the finger $f$ of the trigger may engage the jaw $b$ directly and the dog may be omitted.

The cross-piece $a'$ is preferably provided with serrations, as shown at $a^7$, to prevent the engaging portion of the bait-pan or trigger from sliding thereon after the trap is set, and by placing the said engaging portion in different serrations, the amount of pressure on the bait-pan required to spring the trap may be varied. When the pressure on the trigger is upward, as shown in Figs. 2 and 4, the serrations $a^7$ are made on the under surface of the cross-piece, and when the pressure is downward, as shown in Fig. 3, they are made on the upper surface thereof, and in this case it is not necessary that the stem of the dog should embrace the cross-piece $a'$ of the base-plate of the trap, but the trigger may be connected with the base-plate by a chain or other flexible connection, $i$, so as to prevent it from being detached and lost when the trap is not set.

I do not herein claim the several constructions of the dog illustrated in Figs. 2, 3, and 4, as these constructions are specifically claimed in the other applications hereinbefore referred to.

I claim—

1. The combination of the base-plate with the jaws pivoted thereon and their actuating-spring, and the trigger loosely connected with and having a sliding movement on the cross-piece of the base-plate and controlling the operation of the jaws, substantially as described.

2. The base-plate having a cross-piece provided with serrations, combined with the jaws and their actuating-spring, and the trigger engaging the cross-piece in the said serrations, substantially as described.

In testimony whereof I have signed my name to this specification in the presence of two subscribing witnesses.

JOSEPH J. SKINNER.

Witnesses:
   JOS. P. LIVERMORE,
   H. P. BATES.